United States Patent [19]

Chiba et al.

[11] Patent Number: 5,344,593
[45] Date of Patent: Sep. 6, 1994

[54] ELECTROCONDUCTIVE ELASTOMER-FORMING COMPOSITION

[75] Inventors: Hideki Chiba, Hitachi; Hisao Igarashi, Fukushima; Naoshi Yasuda, Komatsu; Yasuo Matsuki, Oita, all of Japan

[73] Assignee: Japan Synthetic Rubber Co., Ltd., Tokyo, Japan

[21] Appl. No.: 853,813

[22] Filed: Mar. 19, 1992

[30] Foreign Application Priority Data

Mar. 27, 1991 [JP] Japan .................................. 3-085725

[51] Int. Cl.$^5$ .......................... H01B 1/00; H01B 1/20; H01B 1/22
[52] U.S. Cl. .................... 252/514; 252/512; 252/513; 524/862; 528/15; 528/31; 528/32
[58] Field of Search .............. 252/502, 503, 511, 512, 252/513, 514, 518; 524/862; 528/15, 31, 32

[56] References Cited

U.S. PATENT DOCUMENTS

| | | | |
|---|---|---|---|
| 4,547,312 | 10/1985 | Graiver et al. | 252/513 |
| 4,552,688 | 11/1985 | Sakamoto et al. | 252/511 |
| 5,075,038 | 12/1991 | Cole et al. | 252/514 |

FOREIGN PATENT DOCUMENTS

| | | |
|---|---|---|
| 0173560 | 5/1986 | European Pat. Off. . |
| 0264635 | 4/1988 | European Pat. Off. . |
| 0273003 | 6/1988 | European Pat. Off. . |
| 0300380 | 1/1989 | European Pat. Off. . |
| 0367562 | 5/1990 | European Pat. Off. . |
| 2605326 | 4/1988 | France . |
| 56-91302 | 7/1981 | Japan . |
| 57-53602 | 11/1982 | Japan . |

*Primary Examiner*—Paul Lieberman
*Assistant Examiner*—M. Kopec
*Attorney, Agent, or Firm*—Oblon, Spivak, McClelland, Maier & Neustadt

[57] ABSTRACT

An electroconductive elastomer-forming composition comprising (a) 100 parts by weight of a vinyl group-containing polydimethylsiloxane having a standard polystyrene-reduced molecular weight of 10,000–40,000, (b) 5–50 parts by weight of a hydrosilyl group-containing polydimethylsiloxane having a standard polystyrene-reduced molecular weight of 10,000–40,000 and (c) 30–1,000 parts by weight of electroconductive particles. Said composition can form a conductor of small thickness having good conductivity, excellent heat resistance and excellent durability.

16 Claims, No Drawings

ELECTROCONDUCTIVE ELASTOMER-FORMING COMPOSITION

The present invention relates to an electroconductive elastomer-forming composition. More particularly, the present invention relates to a composition which can form an electroconductive elastomer having good heat resistance and good durability.

Currently, conductors are in wide use as a conductor for inspection of circuit substrates, electronic parts, etc. or as a switch element of electronic apparatus, etc.

As such conductors, there have heretofore been widely used conductors comprising a high-molecular elastomer and conductive particles dispersed therein.

In recent years, in the field of integrated circuits, as electronic parts have come to be used therein in a higher density, integrated circuits of flat package type with multipins (e.g. QFP type) have come to become a main stream in place of integrated circuits of DIP type in which terminals are inserted into a substrate. When an integrated circuit of flat package type is inspected for performance, an inspection method employing a conductor as mentioned above is advantageously used because in the conventional inspection method in which electrical contact between circuit substrate and external leads is achieved by contacting the circuit substrate with metal terminals, the intervals between leads are narrow, so that the structure of an inspection socket is complicated.

Conventional conductors, however, have low heat resistance and, when they are exposed to high temperatures for a long time, the elastomer contained therein undergoes deterioration and its electroconductivity is reduced, or the elastomer seizes on a circuit substrate to be inspected. Hence, the use of a conventional conductor in reliability tests at high temperatures (e.g. burn-in test) poses a problem, and seizure on TAB carrier, in particular, is a big problem.

When such an inspection of an integrated circuit for surface mounting is carried out using a conductor, it is preferable in a practical inspection to form a layer of an electroconductive elastomer-forming composition in a paste form in a desired thickness on the surface of the lead electrode area of the circuit substrate on the inspection socket side and then cure the layer to form a conductor which can ensure electrical contact between circuit substrate and external leads.

Heretofore, however, there has been known no electroconductive elastomer-forming composition which can be suitably used to form a conductor by a step as mentioned above and which can give a conductor usable stably for a long time even in high-temperature tests such as burn-in test.

The present inventors have made research for solving the above problems and, as a result, found an electroconductive elastomer-forming composition capable of forming a conductor of small thickness having good conductivity, excellent heat resistance and excellent durability.

According to the present invention, there is provided an electroconductive elastomer-forming composition comprising 100 parts by weight of a vinyl group-containing polydimethylsiloxane having a standard polystyrene-reduced molecular weight of 10,000–40,000 (referred to hereinafter as "component (a)"), 5–50 parts by weight of a hydrosilyl group-containing polydimethylsiloxane having a standard polystyrene-reduced molecular weight of 10,000–40,000 (referred to hereinafter as "component (b)") and 30–1,000 parts by weight of electroconductive particles (referred to hereinafter as "component (c)").

Component (a)

The polydimethylsiloxane containing vinyl groups preferably at the two terminals (component (a)) is the main component of the composition of the present invention, which forms the main portion of an elastomer upon curing. The component (a) can be obtained generally by subjecting dimethyldichlorosilane or a dimethyldialkoxysilane to hydrolysis reaction and condensation reaction in the presence of dimethylvinylchlorosilane or a dimethylvinylalkoxysilane and subsequently subjecting the reaction product to repeated dissolution-precipitation for fractionation.

The component (a) having vinyl groups at the two terminals can also be obtained by subjecting a cyclic siloxane such as octamethylcyclotetrasiloxane to anionic polymerization in the presence of a catalyst and stopping the polymerization using an end terminator to obtain a polymer (as the end terminator, there is selected, for example, dimethyldivinylsiloxane; the reaction conditions (e.g. the amount of cyclic siloxane and the amount of end terminator) are selected appropriately). In this case, as the catalyst, there can be used, for example, an alkali such as tetramethylammonium hydroxide, n-butylphosphonium hydroxide or the like and a solution of a silanolate of said alkali; and the reaction temperature is, for example, 80°–130° C.

The commercial products of the component (a) include, for example, KE-77 (a product of Shin-Etsu Chemical Co., Ltd.), TSE-201 (a product of TOSHIBA SILICONE CO., LTD.), SILASTIC 410 and 430 (products of TORAY INDUSTRIES, INC.) and SILAPLANE FP-2224 and FM-2231 (products of CHISSO CORPORATION).

When the molecular weight of the component (a) is less than 10,000, the resulting electroconductive elastomer has a high hardness and is brittle, making it impossible to obtain a good elastic state. When the molecular weight of the component (a) is more than 40,000, a good elastic state can be obtained but the resulting conductor has low heat resistance and, when used at high temperatures of, for example, about 150° C., may seize on, for example, a circuit substrate with which the conductor is in contact. The molecular weight of the component (a) is preferably 15,000–35,000.

The molecular weight distribution index (the ratio of standard polystyrene-reduced weight-average molecular weight and standard polystyrene-reduced number-average molecular weight (referred to hereinafter as Mw/Mn)) of the component (a) is preferably 2.0 or less in view of the heat resistance of the electroconductive elastomer to be obtained.

To the component (a) may be added other polymer in such an extent that the effect of the present invention is not impaired. Said other polymer includes vinyl group-containing polydimethylsiloxanes whose molecular weights are different from that of the component (a); vinyl group-containing polydimethylsiloxanes whose molecular weights are different from that of the component (a) and whose methyl groups are partially substituted with phenyl groups, i.e. vinyl group-containing, phenyl group-modified polysiloxanes such as vinyl group-containing dimethylsiloxane-diphenylsiloxane copolymer, vinyl group-containing dimethylsiloxanemethylphenylsiloxane copolymer, vinyl group-containing polymethylphenylsiloxane, vinyl group-containing methyltetrachlorophenylsiloxane-dimethylsiloxane copolymer and the like; vinyl group-containing, alkyl group-modified polysiloxanes such as vinyl group-containing polymethylethylsiloxane and the like; and vinyl group-containing, fluorine-modified polysiloxanes such as vinyl group-containing polymethyl-3,3,3-trifluoropropylsiloxane and the like. The content of said other polymer is preferably 5% by weight or less based on the component (a), in view of the heat resistance of the resulting electroconductive elastomer.

Component (b)

In the present invention, the hydrosilyl group-containing polydimethylsiloxane (component (b)) is a component acting as a curing agent for the component (a) which is the main component. The component (b) can be obtained generally by subjecting dimethyldichlorosilane or a dimethyldialkoxysilane to hydrolysis reaction and condensation reaction in the presence of a hydrosilane compound such as dimethylhydrochlorosilane, methyldihydrochlorosilane or a dimethylhydroalkoxysilane and subsequently subjecting the reaction product to repeated dissolution-precipitation for fractionation.

The component (b) can also be obtained by subjecting a cyclic siloxane to anionic polymerization in the presence of a catalyst and stopping the polymerization using an end terminator to obtain a polymer (as the end terminator, there is selected dimethylhydrochlorosilane, methyldihydrochlorosilane or a dimethylhydroalkoxysilane; the reaction conditions (e.g. the amount of cyclic siloxane and the amount of end terminator) are selected appropriately). In this case, as the catalyst, there can be used, for example, an alkali such as tetramethylammonium hydroxide, n-butylphosphonium hydroxide or the like and a solution of a silanolate of said alkali; and the reaction temperature is, for example, 80°–130° C.

The commercial products of the component (b) include, for example, SILAPLANE FH-121 and PS-123 (products of CHISSO CORPORATION).

When the molecular weight of the component (b) is less than 10,000, the resulting electroconductive elastomer has a high hardness and is brittle, making it impossible to obtain a good elastic state. When the molecular weight of the component (b) is more than 40,000, the resulting conductor has low heat resistance and, when used at high temperatures of, for example, about 150° C., may seize on, for example, a circuit substrate with which the conductor is in contact. The molecular weight of the component (b) is preferably 15,000–35,000.

The hydrosilyl equivalent of the component (b) is preferably in the range of 350–1,100. When the hydrosilyl equivalent is more than 1,100, the resulting cured elastomer tends to have surface tackiness and reducing workability.

The Mw/Mn of the component (b) is preferably 2.0 or less in view of the heat resistance of the electroconductive elastomer to be obtained.

To the component (b) may be added other polymer in such an extent that the effect of the present invention is not impaired. Said other polymer includes hydrosilyl group-containing polydimethylsiloxanes whose molecular weights and/or hydrosilyl equivalents are different from those of the component (b); hydrosilyl group-containing polydimethylsiloxanes whose molecular weights are different from that of the component (b) and whose methyl groups of siloxane are partially substituted with phenyl groups, i.e. hydrosilyl group-containing, phenyl group-modified polysiloxanes such as hydrosilyl group-containing dimethylsiloxane-diphenylsiloxane copolymer, hydrosilyl group-containing dimethylsiloxanemethylphenylsiloxane copolymer, hydrosilyl group-containing polymethylphenylsiloxane, hydrosilyl group-containing methyltetrachlorophenylsiloxanedimethylsiloxane copolymer and the like; hydrosilyl group-containing, alkyl group-modified polysiloxanes such as hydrosilyl group-containing polymethylethylsiloxane and the like; and hydrosilyl group-containing, fluorine-modified polysiloxanes such as hydrosilyl group-containing polymethyl-3,3,3-tirfluoropropylsiloxane and the like. The content of the polymer is preferably 5% by weight or less based on the component (b), in view of the heat resistance of the resulting electroconductive elastomer.

In the present invention, the proportion of the component (b) to the component (a) is 5–50 parts by weight, preferably 10–30 parts by weight per 100 parts by weight of the component (a). When the proportion of the component (b) is less than 5 parts by weight, the curing state of the resulting electroconductive elastomer is insufficient, making it impossible to obtain a good elastic state. When the proportion is more than 50 parts by weight, the cured electroconductive elastomer has a high hardness, making it impossible to obtain a good electroconductive elastomer, and the elastomer yellows and undergoes thermal deterioration when used at high temperatures.

In the component (a) (vinyl group-containing polydimethylsiloxane) and the component (b) (hydrosilyl group-containing polydimethylsiloxane), a part (for example, 2–15%) of the methyl groups in the molecule are preferably substituted with phenyl groups. In that case, the resulting electroconductive elastomer has particularly high heat resistance.

The above-mentioned standard polystyrene-reduced molecular weight is a value obtained by subjecting a sample (0.5 g of a polymer dissolved in 100 ml of tetrahydrofuran) to gel permeation chromatography using a constant-temperature high-speed gel permeation chromatogram HLC-802 A (a product of TOYO SODA MFG. CO., LTD.) having a column TSK-GEL (⅜ inch-30 cm, a product of TOYO SODA MFG. CO., LTD.) at a flow rate of 1 ml/min. The standard polystyrene used was a product of Pressure Chemical Co. of USA.

Component (c)

As the electroconductive particles (c), there can be used known particles of metals having electro-conductivity, such as nickel, iron, copper, zinc, chromium, silver, cobalt, aluminum and the like, and particles of alloys of at least two of said metals having electroconductivity.

Of these, particles of such metals having electroconductivity as nickel, iron and copper are preferable in view of the economy and electroconductivity. Nickel particles whose surfaces are coated with gold are particularly preferable.

Electroconductive carbon black may also be used.

The particle diameters of the component (c) are preferably 3–200 μm, particularly preferably 10–100 μm. When electroconductive particles having such particle diameters are used, it is possible to obtain, in the resulting electroconductive elastomer during its use, sufficient electrical contact between the electroconductive particles.

The shape of the electroconductive particles are not critical but are preferably spherical or star-shaped in view of the dispersibility in the component (a) and the component (b) or their mixture.

The nickel particles whose surfaces are coated with gold, used particularly preferably as the component (c) are obtained by coating gold on the surfaces of nickel particles by electroless plating. The nickel particles whose surfaces are coated with gold, have very low contact resistance. The film thickness of gold plating is preferably 1,000 Å or more.

In the present invention, the component (c) is used in a proportion of 30–1,000 parts by weight, preferably 50–750 parts by weight, per 100 parts by weight of the component (a). When the proportion of the component (c) is less than 30 parts by weight, the resulting electroconductive elastomer shows no sufficiently low electrical resistance when it is used, and therefore has no sufficient connecting function. When the proportion is more than 1,000 parts by weight, the resulting cured elastomer is brittle, making difficult its use as an electroconductive elastomer.

The electroconductive elastomer-forming composition of the present invention comprising the components (a), (b) and (c) may comprise, as necessary, an inorganic filler such as ordinary silica powder, colloidal silica, aerogel silica, alumina or the like. The inclusion of such an inorganic filler allows the uncured composition to have sufficient thixotropy, a higher viscosity and improved dispersion stability of electroconductive particles and the cured elastomer to have an improved strength.

The amount of the inorganic filler used is not critical. However, its use in too large an amount is undesirable because the sufficient orientation of the electroconductive metal particles in a magnetic field is impossible. Incidentally, the viscosity of the electroconductive elastomer-forming composition of the present invention is preferably in the range of 100,000–1,000,000 cp at 25° C.

In the electroconductive elastomer-forming composition of the present invention, the component (b) acts as a curing agent for the component (a) which is the main component of the composition, whereby curing takes place; in particular, when the composition is heated, crosslinking reaction takes place, whereby an elastomer of high elasticity is formed; and the elastomer has a function as an electroconductive elastomer because it contains the component (c).

The electroconductive elastomer-forming composition of the present invention may comprise a curing catalyst to cure the composition. Said curing catalyst may be any curing catalyst as long as it is usable as a catalyst for hydrosilylation reaction, and specifically includes known curing catalysts such as chloroplatinic acid and its salts, platinum-unsaturated group-containing siloxane complexes, complex between vinylsiloxane and platinum, complex between platinum and 1,3-divinyltetramethyldisiloxane, complexes between triorganophosphine or phosphite and platinum, platinum acetylacetonate chelate, complexes between cyclic dienes and platinum, and the like.

The method of addition of the curing catalyst is not critical. However, the curing catalyst is preferably mixed with the component (a) (the main component) in advance, in view of the storage stability of the composition, the prevention of uneven distribution of the curing catalyst during components-mixing, etc.

The amount of the curing catalyst used is preferably determined appropriately in view of actual curing rate, working life, etc. In order to control the curing rate and the working life, it is possible to use, in combination with the curing catalyst, a hydrosilylation reaction-controlling agent conventionally used such as amino group-containing siloxane, hydroxyl group-containing siloxane or the like.

The electroconductive elastomer-forming composition of the present invention is in a paste form. The composition is formed into an appropriate film and then cured while or after applying, as necessary, a parallel magnetic field to the composition in the thickness direction to orientate the electroconductive metal particles contained in the composition, whereby an electroconductive elastomer in a sheet form can be formed.

In applying a parallel magnetic field, a magnetic plate having areas of different magnetic intensities can be used to form an anisotropic electroconductive sheet in which the distribution of the component (c) is uneven and electroconductive portions and insulating portions exist. The electroconductive portions of the sheet may show pressure-sensitive electroconductivity under which said portions give reduced resistance when pressed in the thickness direction.

The electroconductive elastomer-forming composition of the present invention is coated on the surfaces of any desired portion of a device, requiring electrical connection, for example, the surfaces of the lead electrode portion of a circuit substrate and then cured while or after applying, as necessary, a parallel magnetic field to the coated composition in the thickness direction, whereby an electroconductive layer can be formed in a state in which said layer is bonded or adhered to said portion in one piece.

The electroconductive elastomer-forming composition of the present invention may comprise a silane coupling agent and/or a titanium coupling agent, whereby the conductor after curing can have sufficient adhesion to, for example, a circuit substrate.

Thus, the electroconductive elastomer-forming composition of the present invention is very useful as a material for forming, for example, (1) a burn-in board for burn-in test of integrated circuits, integrated circuits for surface mounting having a large number of leads, in particular, (2) an electroconductive elastomer used as a connector for inspection of various electronic parts and circuit substrates particularly at high temperatures, and (3) an electroconductive elastomer used as a switch element of electronic apparatus requiring heat resistance.

In the electroconductive elastomer-forming composition of the present invention, each of the vinyl group-containing polydimethylsiloxane (which is the main component for forming an electroconductive elastomer) and the hydrosilyl group-containing polydimethylsiloxane (a curing agent) has a molecular weight of a specific range and the electroconductive particles are contained in a specific proportion. Hence, the composition, when cured, can give an electroconductive elastomer which shows excellent heat resistance and good high-temperature durability, which has no fear of seizure on a circuit substrate, etc. with which the elastomer is contacted, and which has good electroconductivity.

The present invention is hereinafter described in more detail referring to Examples. However, the present invention is by no means restricted by the Examples. In the Examples, parts refer to parts by weight.

The component (a), the component (b), the component (c), the inorganic filler and the curing catalyst used in the following Examples are as follows.

Component (a)

a1: SILAPLANE FP-2224 (polydimethylsiloxane having a weight-average molecular weight of 18,000 and vinyl groups at the two terminals (a product of CHISSO CORPORATION))

a2: SILAPLANE FP-2231 (polydimethylsiloxane having a weight-average molecular weight of 34,000 and vinyl groups at the two terminals (a product of CHISSO CORPORATION))

a3: SILAPLANE PS-444 (polydimethylsiloxane having a weight-average molecular weight of 42,000 and vinyl groups at the two terminals (a product of CHISSO CORPORATION))

a4: SILAPLANE FM-2241 (polydimethylsiloxane having a weight-average molecular weight of 76,000 and vinyl groups at the two terminals (a product of CHISSO CORPORATION))

a5: SILAPLANE FM-2242 (polydimethylsiloxane having a weight-average molecular weight of 99,000 and vinyl groups at the two terminals (a product of CHISSO CORPORATION))

Component (b)

b1: SILAPLANE FM-1121 (hydrosilyl group-containing polydimethylsiloxane having a weight-average molecular weight of 11,500 (a product of CHISSO CORPORATION))

b2: SILAPLANE PS-123 (hydroxilyl group-containing polydimethylsiloxane having a weight-average molecular weight of 19,000 (a product of CHISSO CORPORATION))

Component (c)

Metal particles 1: Nickel particles having an average particle diameter of 40 $\mu m$ Metal particles 2: Obtained by applying electroless plating to 100 parts of nickel particles (average particle diameter: 40 $\mu m$) using 2 parts of gold (this amount of gold is an amount which gives a gold film thickness of 1,200 Å when the nickel particles are assumed to be truly spherical).

Inorganic Filler

Aerogel silica: AEROSIL R821 (trade name) (a product of NIPPON AEROSIL CO., LTD.)

Curing Catalyst

A platinum catalyst consisting of a light yellow, transparent liquid obtained by adding tetramethyl-1,3-5,7-tetravinylcyclotetrasiloxane to a mixture consisting of 10 parts of sodium chloroplatinate, 10 parts of ethanol and 3 parts of sodium bicarbonate, heating the resulting mixture at 70°-75° C. for 1 hour, removing volatile components from the mixture under the conditions of 95° C. and 25 mmHg (absolute pressure) while blowing nitrogen gas, to obtain a mixture of a yellow liquid and a solid, cooling the mixture and filtering the resulting mixture.

EXAMPLES 1–4 AND COMPARATIVE EXAMPLES 1–4

A mixture of component (a), component (b), component (c), inorganic filler and curing catalyst according to the compounding recipe shown in Table 1 or 2 was kneaded using a twin-roll, for 20 minutes. The kneaded product was thoroughly deaerated under vacuum to obtain compositions in a paste form.

Each of the compositions was placed in a plate-like mold having a groove of 1.2 mm in depth. The composition in the mold was extended into a sheet form with a roll or a squeegee, and the sheet was cured in a hot booth at 150° C. for 30 minutes to obtain electroconductive elastomer sheets of 1.2 mm in thickness.

Heat Resistance Test

Each of the above-obtained electroconductive elastomer sheets was put on a gold-plated circuit substrate or TAB carrier tape; the resulting assembly was allowed to stand at 150° C. while applying a load of 2 kg/cm$^2$; and the occurrence of seizure was examined with the lapse of time.

The results are shown in Tables 3 and 4. In Tables 3 and 4, heat resistance was evaluated based on the following yardstick.

A: There occurred neither bleeding nor sticking to substrate caused by seizure.

B: There occurred bleeding which was barely observed visually, or sticking to substrate caused by seizure to such an extent that the elastomer sheet did not slip down.

C: There occurred bleeding which was clearly observed visually, or sticking to substrate caused by seizure to such an extent that the elastomer sheet was peeled by hand.

D: There occurred bleeding on the whole surface, or sticking to substrate caused by seizure to such an extent that the elastomer sheet was not peeled by hand.

Preparation of Circuit Substrate Device Having Anisotropic Electroconductive Elastomer Sheet Layer Each of the above-obtained compositions was printed on the lead electrode portion of a circuit substrate having 240 lead electrodes each made of copper of 0.15 mm in width (electrode-to-electrode pitch: 0.25 mm), in a width of 1.0 mm and in a layer thickness of about 0.3 mm in a direction orthogonal to the direction of the backside of electrodes; the printed composition was cured at 150° C. for 30 minutes while applying a parallel magnetic field in the thickness direction, to form an anisotropic electroconductive elastomer sheet layer in a state in which the sheet layer and the circuit substrate formed one piece; thus, circuit substrate devices each having an anisotropic electroconductive elastomer sheet layer was produced.

Durability Test

To the anisotropic electroconductive sheet layer portion of each of the above-obtained circuit substrate devices was applied a load of a weight which yielded a strain of 25% to the sheet layer; each circuit substrate device was allowed to stand at 150° C. under said load; with the lapse of time, the resistance of the anisotropic electroconductive elastomer sheet layer in the thickness direction was measured on each lead electrode and average of the electrical resistance values of 240 lead electrodes was calculated. The results are shown in Tables 3 and 4.

TABLE 1

|  | Example | | | |
|---|---|---|---|---|
|  | 1 | 2 | 3 | 4 |
| Component (a) | | | | |
| Kind | a1 | a1 | a1 | a2 |
| Weight-average molecular weight | 18,000 | 18,000 | 18,000 | 34,000 |
| Molecular weight distribution index | 2.0 | 2.0 | 2.0 | 1.7 |
| Purity (% by weight) | 96 | 96 | 96 | 96 |
| Amount used (parts) | 100 | 100 | 100 | 100 |
| Component (b) | | | | |
| Kind | b1 | b1 | b2 | b1 |
| Weight-average molecular weight | 11,500 | 11,500 | 19,000 | 11,500 |
| Molecular weight distribution index | 1.6 | 1.6 | 1.6 | 1.6 |
| Purity (% by weight) | 96 | 96 | 95 | 96 |
| Hydrosilyl equivalent | 1,000 | 1,100 | 350 | 1,100 |
| Amount used (parts) | 30 | 30 | 15 | 15 |
| Component (c) | | | | |
| Metal particles 1 (parts) | 158 | — | 143 | 143 |
| Metal particles 2 (parts) | — | 158 | — | — |
| Inorganic filler (parts) | 18 | 18 | 18 | 18 |
| Curing catalyst (ppm) | 10 | 10 | 10 | 10 |

TABLE 2

|  | Comparative Example | | | |
|---|---|---|---|---|
|  | 1 | 2 | 3 | 4 |
| Component (a) | | | | |
| Kind | a3 | a3 | a4 | a5 |
| Weight-average molecular weight | 42,000 | 42,000 | 76,000 | 99,000 |
| Molecular weight distribution index | 1.9 | 1.9 | 1.6 | 1.6 |
| Purity (% by weight) | 97 | 97 | 94 | 88 |
| Amount used (parts) | 100 | 100 | 100 | 100 |
| Coponent (b) | | | | |
| Kind | b1 | b1 | b1 | b1 |
| Weight-average molecular weight | 11,500 | 11,500 | 11,500 | 11,500 |
| Molecular weight distribution index | 1.6 | 1.6 | 1.6 | 1.6 |
| Purity (% by weight) | 96 | 96 | 96 | 96 |
| Hydrosilyl equivalents | 1,100 | 1,100 | 1,100 | 1,100 |
| Amount used (parts) | 15 | 15 | 15 | 9 |
| Component (c) | | | | |
| Metal particles 1 (parts) | 143 | — | 143 | 137 |
| Metal particles 2 (parts) | — | 143 | — | — |
| Inorganic filler (parts) | 18 | 18 | 18 | 18 |
| Curing catalyst (ppm) | 10 | 10 | 10 | 10 |

TABLE 3

| Temp. | Time (hr) | Substrate | Example | | | |
|---|---|---|---|---|---|---|
|  |  |  | 1 | 2 | 3 | 4 |
| Heat resistance | | | | | | |
| 140° C. | 100 | TAB carrier tape | A | A | A | A |
|  |  | Circuit substrate | A | A | A | A |
|  | 250 | TAB carrier tape | A | A | A | A |
|  |  | Circuit substrate | A | A | A | A |
|  | 500 | TAB carrier tape | B | A | A | B |
|  |  | Circuit substrate | B | A | A | B |
| Durability (Ω) | | | | | | |
| Room temp. | Initial | — | 0.29 | 0.20 | 0.25 | 0.31 |
| 150° C. | 100 | — | 0.31 | 0.22 | 0.27 | 0.33 |
|  | 200 | — | 0.36 | 0.29 | 0.31 | 0.38 |
|  | 300 | — | 0.38 | 0.27 | 0.34 | 0.39 |
|  | 400 | — | 0.39 | 0.30 | 0.37 | 0.42 |
|  | 500 | — | 0.40 | 0.31 | 0.38 | 0.42 |

TABLE 4

| Temp. | Time (hr) | Substrate | Comparative Example | | | |
|---|---|---|---|---|---|---|
|  |  |  | 1 | 2 | 3 | 4 |
| Heat resistance | | | | | | |
| 140° C. | 100 | TAB carrier tape | C | C | C | C |
|  |  | Circuit substrate | C | C | C | C |
|  | 250 | TAB carrier tape | C | C | C | D |
|  |  | Circuit substrate | C | C | C | D |
|  | 500 | TAB carrier tape | D | D | D | D |
|  |  | Circuit substrate | D | D | D | D |
| Durability (Ω) | | | | | | |
| Room temp. | Initial | — | 0.32 | 0.25 | 0.35 | 0.37 |
| 150° C. | 100 | — | 0.34 | 0.30 | 0.40 | 0.41 |
|  | 200 | — | 0.37 | 0.32 | 0.45 | 0.45 |
|  | 300 | — | 0.40 | 0.34 | 0.49 | 0.49 |
|  | 400 | — | 0.45 | 0.39 | 0.53 | 0.53 |
|  | 500 | — | 0.52 | 0.45 | 0.57 | 0.60 |

What is claimed is:

1. An electroconductive elastomer-forming composition consisting of (a) 100 parts by weight of a vinyl group-containing polydimethylsiloxane having a standard polystyrene-reduced molecular weight of 10,000–40,000, and up to 5% by weight based on component (a) of another polysiloxane, (b) 5–50 parts by weight of a hydrosilyl group-containing polydimethylsiloxane having a standard polystyrene-reduced molecular weight of 10,000–40,000, and up to 5% by weight based on component (b) of another hydrosilyl group-containing polysiloxane, (c) 30–1,000 parts by weight of electroconductive particles, an inorganic filler other than the electroconductive particles and a curing catalyst.

2. The composition according to claim 1, wherein the polydimethylsiloxane (a) contains vinyl groups at the two terminals.

3. The composition according to claim 1, wherein the molecular weight distribution index (standard polystyrene-reduced weight-average molecular weight, Mw/standard polystyrene-reduced number-average molecular weight, Mn) of the component (a) is 2.0 or less.

4. The composition according to claim 1, wherein said another polysiloxane is a vinyl group-containing polydimethylsiloxane whose molecular weight is different from that of the component (a), or a vinyl group-containing polydimethylsiloxane whose molecular weight is different from that of the component (a) and whose methyl groups are partially substituted with phenyl groups.

5. The composition according to claim 1, wherein the component (b) has a hydrosilyl equivalent in a range of 350–1,100.

6. The composition according to claim 1, wherein the Mw/Mn of the component (b) is 2.0 or less.

7. The composition according to claim 1, wherein said another hydrosilyl group containing polysiloxane is a hydrosilyl group-containing polydimethylsiloxane whose molecular weight or hydrosilyl equivalent or both of them are different from those of the component (b), or a hydrosilyl group-containing polydimethylsiloxane whose molecular weight is different from that of the component (b) and whose methyl groups of siloxane are partially substituted with phenyl groups.

8. The composition according to claim 7, wherein the proportion of the component (b) to the component (a) is 10–30 parts by weight per 100 parts by weight of the component (a).

9. The composition according to claim 1, wherein the electroconductive particles (c) are particles of at least one metal having electroconductivity.

10. The composition according to claim 9, wherein the metal having electroconductivity is nickel, iron, copper, zinc, chromium, silver, cobalt or aluminum.

11. The composition according to claim 9, wherein the metal having electroconductivity is nickel, iron or copper.

12. The composition according to claim 1, wherein the electroconductive particles (c) are nickel particles whose surfaces are coated with gold.

13. The composition according to claim 1, wherein the electroconductive particles (c) have particle diameters of 3–200 $\mu$m.

14. The composition according to claim 1, wherein the proportion of the electroconductive particles (c) is 10–750 parts by weight per 100 parts by weight of the component (a).

15. The composition of claim 1, wherein the inorganic filler is aerogel silica.

16. The composition of claim 1, wherein the curing catalyst is a platinum catalyst obtained by adding tetramethyl-1,3,5,7-tetravinylcyclotetrasiloxane to sodium chloroplatinate.

* * * * *